United States Patent [19]

Secamiglio et al.

[11] 4,416,255
[45] Nov. 22, 1983

[54] WEDGE-SHAPED SOLAR AIR HEATING DEVICE

[75] Inventors: John J. Secamiglio, Roanoke, Va.; Edward T. Secamiglio, Philadelphia, Pa.; Anthony J. Secamiglio, Roanoke, Va.

[73] Assignee: Sun Powered Inc., Roanoke, Va.

[21] Appl. No.: 385,083

[22] Filed: Jun. 4, 1982

[51] Int. Cl.³ .............................................. F24J 3/02
[52] U.S. Cl. .................................. 126/422; 126/429; 126/449; 126/450
[58] Field of Search ............... 126/428, 429, 432, 441, 126/445, 449, 450, 422

[56] References Cited

U.S. PATENT DOCUMENTS

| Re. 30,136 | 11/1979 | Schriefer | 126/441 |
|---|---|---|---|
| 3,875,925 | 4/1975 | Johnston | 126/429 X |
| 4,059,226 | 11/1977 | Atkinson | 126/429 X |
| 4,072,142 | 2/1978 | Lof | 126/449 X |
| 4,121,565 | 10/1978 | Grisbrook | 126/429 X |
| 4,141,337 | 2/1979 | Bergen | 126/429 |
| 4,175,541 | 11/1979 | Midgley | 126/429 |
| 4,300,532 | 11/1981 | Olsen | 126/429 X |
| 4,314,549 | 2/1982 | Swanson | 126/449 |

FOREIGN PATENT DOCUMENTS 2351364 12/1977 France ................. 126/429

Primary Examiner—Samuel Scott
Assistant Examiner—Margaret A. Focarino
Attorney, Agent, or Firm—F. W. Guay & Associates

[57] ABSTRACT

Wedge-shaped solar air heating device adapted to be mounted exteriorly of a building with its tapered end uppermost and in operative relationship with a window opening or other opening in the wall of the building, said device having two interconnected chambers, one for passage of cool air and the other for heating said cool air by solar radiation.

14 Claims, 5 Drawing Figures

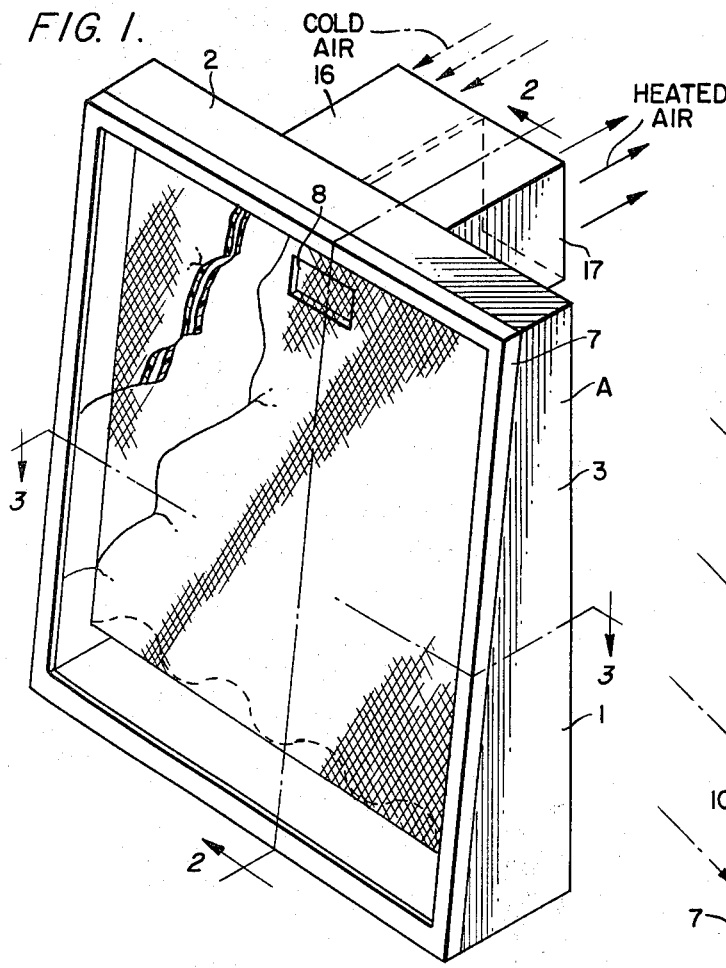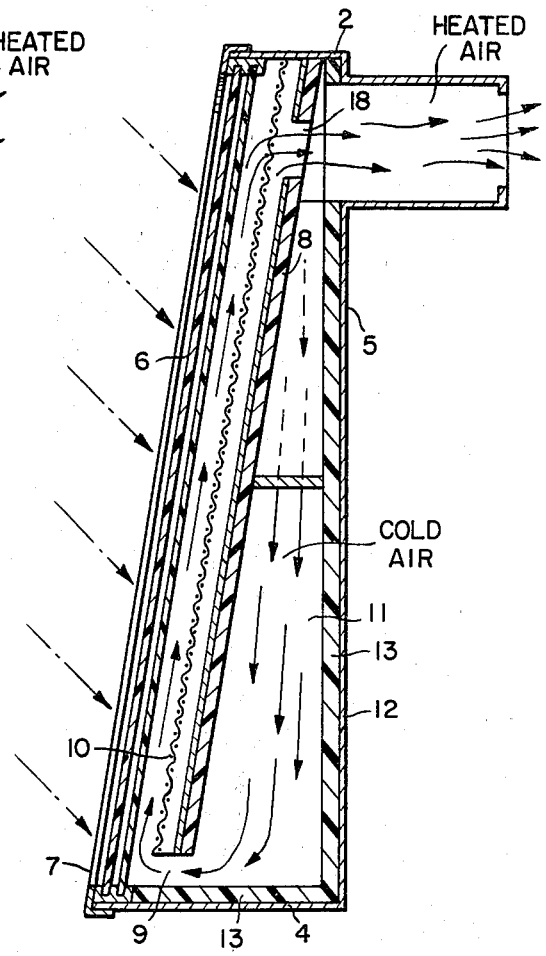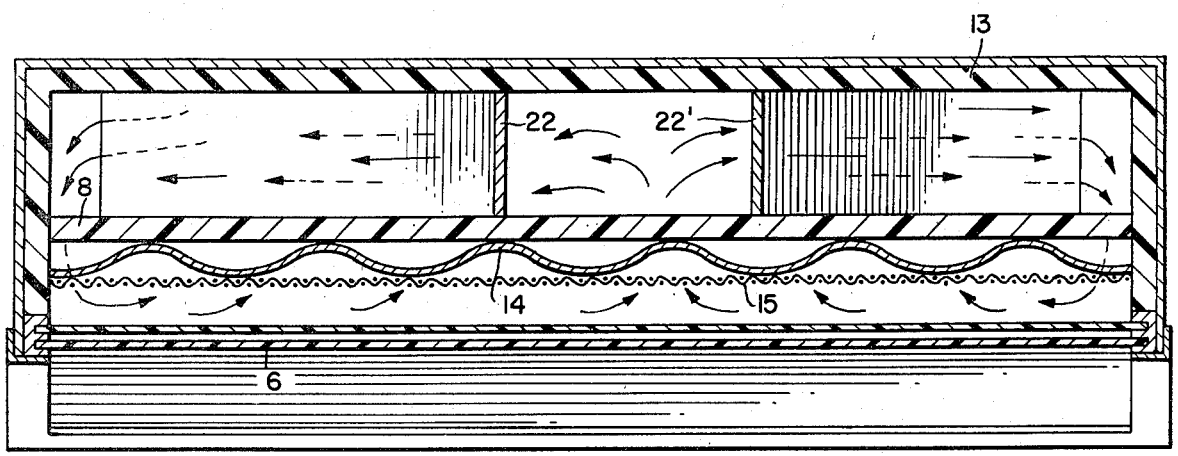

WEDGE-SHAPED SOLAR AIR HEATING DEVICE

BACKGROUND AND SUMMARY OF THE INVENTION

The present invention relates to a passive solar energy unit. More particularly, the instant discovery concerns a solar air heating device which is readily installed and has a generally wedge-shaped casing adapted to be mounted exteriorly of a building with the tapered end of the casing being uppermost and in operative relationship with a window opening or other opening in the wall of the building. The casing has a front wall (pane), a rear wall, rectangular top and bottom walls, and essentially triangular-shaped parallel side walls, each of the top, bottom and side walls being substantially narrower than the front and rear walls, and the latter two being of the same configuration. As mounted, the rear wall is essentially parallel with the building exterior wall and abuts it, thus the front pane is inclined toward the building and provides a much more favorable angle of incidence to the sun than known box-like passive solar energy units having vertical front walls. See Grisbrook, U.S. Pat. No. 4,121,565, issued Oct. 24, 1978.

Operative or functional relationship with the aforementioned building opening is afforded by two (2) ducts extending rearwardly from corresponding openings in the upper central portion of the rear wall of the casing, which ducts are fitted into the building opening and, as will be seen, one duct provides a means for ingress of cool air into the aforesaid wedge-shaped casing and the other duct provides a means for egress of heated air from the casing.

There is a front chamber and a rear chamber formed by a heat-impervious divider panel extending transversely and the full length between the pair of side walls of the casing, the divider panel being inclined essentially parallel with the front pane. While the divider panel ends abut the side and top walls, the lower end of the panel terminates spacedly above the bottom wall, thus forming a passage connecting the cool air chamber with the heat collector chamber.

The front wall is a double-glazed pane pervious to to the sun's rays. As will be seen hereinafter, the forwardly-presented surface of the heat-impervious divider panel is covered with a heat collector of sheet material having evenly-spaced, longitudinal, alternating half-round contours (rounded corrugation) with a superimposed fine mesh metal screen.

Typically, as indicated infra, the above-described unit is of lightweight materials and has, say, essentially parallel ingress and egress rearwardly-extended ducts which can be inserted through an open window of the double-hung sash type and suspended from the window sill thereof by resting the underside of the ducts of accommodating configuration on the sill with the casing rear wall adjacent the building's exterior surface. By closing the lower window sash onto the top of ducts of likewise accommodating configuration, the ducts are pinched between the undersurface of the lower window sash and the sill. Preferably, the ducts are parallel and contiguous or integral and of a total width commensurate with that of the window, thus obviating the need for calking interstices.

Of course, peripheral flanges may be positioned about the exterior of the rear wall of the casing and/or the ducts if it is desired to further secure the casing to the building by screw means, or the like.

DESCRIPTION OF THE PREFERRED EMBODIMENT

FIG. 1 is a front perspective view of the wedge-shaped solar air heating device of the instant discovery, including casing and ducts extending rearwardly therefrom.

FIG. 2 is a sectional view, transverse and vertical, along line 2—2 of FIG. 1.

FIG. 3 is a sectional view, transverse and horizontal, along line 3—3 of FIG. 1.

Figure 5:
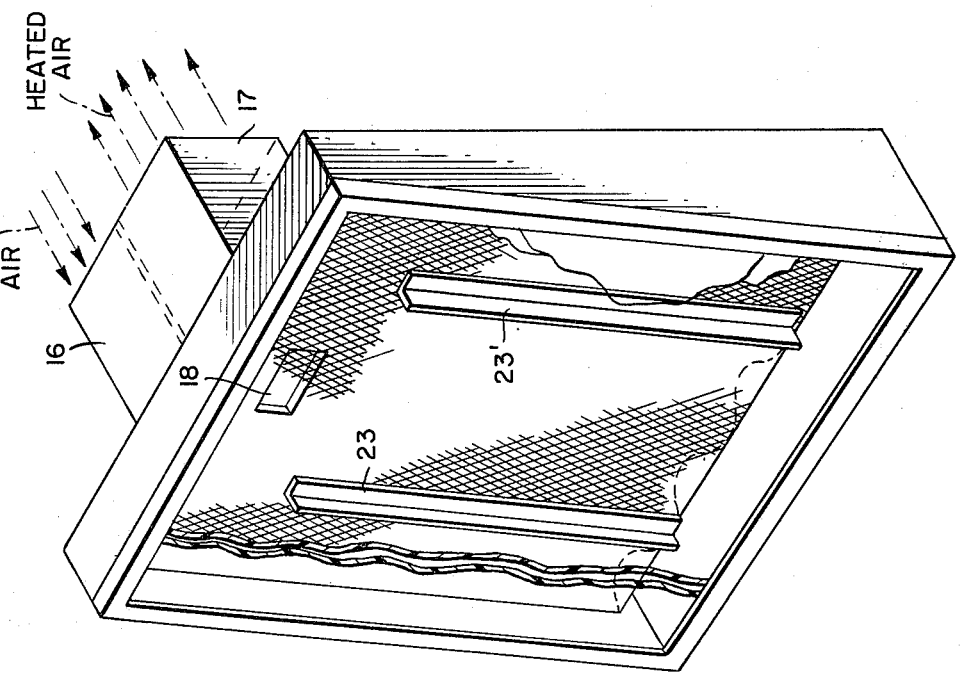
FIG. 5 is a perspective view of the solar heating device with double pane broken away, thus exposing a modification comprising baffles mounted on the screening and the substrate rounded corrugation.

The preferred embodiment of the invention is illustrated in the just-noted drawings. Reference numerals in the drawings indicate component parts and sections of the preferred embodiment illustrated by the drawings. Reference character A of FIG. 1 designates generally the passive solar energy device of the present invention which comprises a wedge-shaped casing 1 adapted to be mounted exteriorly of a building with its tapered end being uppermost.

Figure 4:
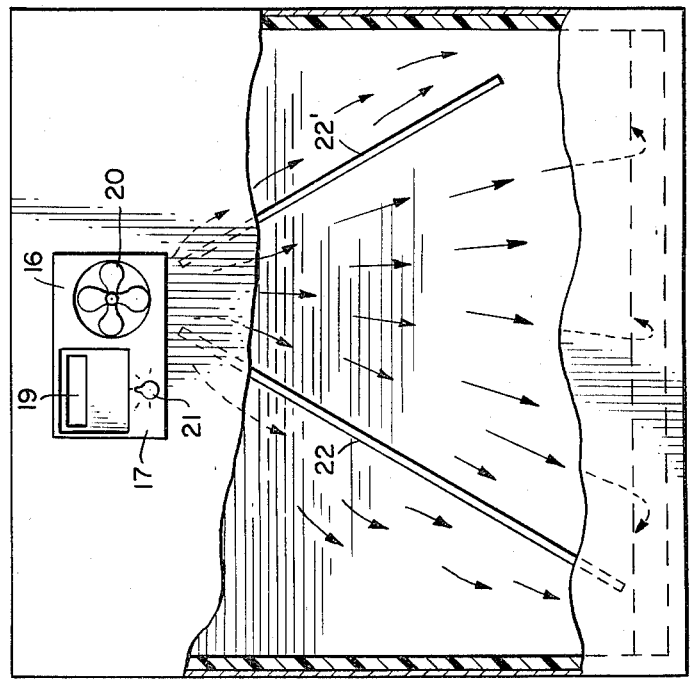
FIG. 4 is a rear elevation of the solar heating device with parts broken away.

The device has a top wall 2, two parallel side walls 3,3', a bottom wall 4 (FIG. 2) and a rear wall 5 (cf. FIG. 4 showing a broken away view through the rear wall.)

Obviously, from the drawings, the top and bottom walls are rectangular and of equal length, with the former, however, being substantially narrower than the latter due to the wedge shape of the passive solar heating device.

The front wall of the self-contained solar heating device of the instant discovery comprises a double-glazed pane 6 disposed across the entire front of the casing 1 which is affixed to the casing by a frame 7. Both panes are heat pervious and, preferably, of a polymeric sheet material (glazing) and spaced apart by about $\frac{1}{2}$ inch (though greater spacing up to about $1\frac{1}{2}$ inches may be used), the glazing being of conventional, lightweight, dimensionally-stable material.

The glazing 6 is inclined toward the building at an angle between about 5° and about 25°, preferably about 10° and about 17°, these angles providing optimum incidence to the sun.

Disposed within casing 1 is a heat-impervious divider panel 8 which is essentially parallel with double pane 6 as shown in FIG. 2, and extends transversely of the pair of side walls 3,3', the upper end of which divider is likewise flush with top wall 2 and its lateral ends are likewise flush with side walls 3,3'. The lower end of the divider panel, however, terminates spacedly above the bottom wall 4 (FIG. 2), forming passage 9 between chambers 10 and 11 likewise formed within casing 1 by the disposition of divider panel 8. The purpose of this resultant configuration is discussed infra.

The casing 1 walls, but for the front wall 6, comprise, preferably, an integral outer skin of sheet metal 12 sandwiched with a likewise integrated inner heat impervious liner 13. (Cf. FIGS. 2 and 3). Of course, other materials may be used for construction of the casing's side, top, rear and bottom walls, such as fiber board, pressed board, and the like, so long as the materials are heat-impervious and the structure is integrated to prevent heat loss.

The forwardly-presented surface of the heat-impervious divider panel 8 is covered with a heat collector of a corrugated sheet (preferably rounded and embossed). See FIG. 3. In turn, the corrugated sheet is covered with a fine mesh metal screen 15.

Preferably, the corrugated sheet 14 is, as shown in FIG. 3, in contact with the substrate divider panel 8, and, in turn, the metal screen is in contact with the corrugated sheet, as also shown in FIG. 3. Heat collection is best accomplished by coating the fine mesh screen and the corrugated sheet with flat black paint or other like coating which is heat absorptive.

A cold air duct 16 and a heated air duct 17 are mounted in parallel in the upper rear wall 5 of solar heating device A, these ducts being in communication, respectively, with cool air chamber 11 and heated air chamber 10. Aperture 18 through corrugation 14 and divider panel 8 provides passage for heated air from chamber 10 to duct 17, which heated air is emitted into the building through opening 19 (FIG. 4). Cool air, on the other hand, is drawn into duct 16 by, for example, intake fan 20 and introduced into cool air chamber 11.

If desired, a conventional thermostatic control means 21 may be utilized to monitor the temperature of the air passing through duct 117 and opening 19 (FIG. 4) and the control fan 20.

As shown in FIG. 4, downwardly diverging baffles 22 and 22' are disposed across the cool air chamber 11 from back to front, the upper ends of said baffles being spaced apart and located in the mouth of the chamber. Said baffles distribute cool air entering the heat collector chamber 10 via passage 9, thus providing efficient use of the heat collector means 14 and 15. Preferably baffles 22 and 22' extend downwardly at least about $\frac{2}{3}$ the length of cool air chamber 11. Preferably, also, baffle 22 is longer than baffle 22' in view of the fact that duct 16 is off center. See FIG. 4.

Optional are angle baffles 23, 23' or the like, preferably of lightweight materials, such as aluminum, these baffles being vertically disposed and in parallel. FIG. 5 shows them mounted against screen 15. Again, more uniform distribution of air passing through heat collector chamber 10 is achieved.

In operation, the wedge-shaped solar air heating device A of the present invention draws cool air from inside the building by means of intake fan 20 (FIG. 5) and directs it through duct 16 (FIG. 1) and thence down the throat of cool air chamber 11, the air being channeled by baffles 22, 22'. (FIGS. 3 and 4) as it enters and courses through said chamber. Upon leaving this chamber the air travels through passage 9 (See FIG. 1 and FIG. 4) and upwardly through chamber 10 where it is heated by means of heat collected from the sun's rays by virtue of the very substantial surface area afforded by the aforedescribed black metal screen 15 (preferably of aluminum) and the embossed corrugated sheet 14 of likewise black forwardly-presented surface.

The screen and corrugation combination create a very desirable turbulence, as well as considerable surface area, which significantly enhances heat transfer and, of course, heat collection.

As indicated heretofore, the double glazing inclined toward the building provides optimum incidence to the sun and, hence, much improved solar radiation over the known box-like solar heating units. Also, double glazing acts as a superior barrier between the outside ambient air and the captured heat in casing A. Preferably the space between the inner glazing and the screening is at least about $\frac{3}{4}$ inch and not over $1\frac{1}{2}$ inches. It has been found that a small amount of silica gel disposed on the inside bottom of the double glazing obviates any inner condensation ($H_2O$) which could partially affect the efficiency of the heating chamber.

Very effective results are realized using polymeric inner and outer glazing. For example, fiber-reinforced polyester sheet material is very effective as an outer glazing and polyvinylfluoride sheet material as an inner glazing. Of course, other transparent and translucent sheet materials may be employed. Glass, of course, would increase the weight of the unit considerably. In this vein, lightweight insulation 13 is much preferred over, say, hardboard, pressed board, or the like. Polyisocyanurate insulation at least about $\frac{1}{2}$ inch in thickness has proven very functional. Also, sheet aluminum is very practical as an outer skin 12 for the casing. Again, other materials may be used, such as hardboard, pressed board, and the like.

As is obvious from the description supra as to installation, the solar heating device of the present invention is very readily and easily mounted in a window, being that it is portable, inter alia. Of course, smaller units may be used in windows in high-rise apartments, say, where fewer BTU's are required. For maximum efficiency, the solar heating devices of the present invention are best placed in a window having a southern exposure.

Baffles 22,22' and divider panel 8 are preferably of lightweight construction materials such as aforementioned with respect to insulation 13. Sheet aluminum baffles are very serviceable. It should be noted here that in the residence size unit (ca. 48"×48" glazing) the use of baffles in the cool air chamber 11 effected a considerable increase in heat transfer.

What we claim is:

1. A solar heating device adapted to be mounted against the exterior of a building and having rearwardly extending ducts for insertion into a building through an opening to the interior of the building, which comprises means defining a wedge-shaped casing having a heat pervious front wall inclined toward the building at an angle providing incidence to the sun and providing a wedge-shaped configuration with the tapered end being uppermost, two parallel essentially triangular side walls, bottom and top walls, and a rear wall, said casing having internally thereof a divider panel parallel and coextensive with the inclined front wall but for the lower end of the panel which terminates spacedly above the bottom, thus forming a passage from resultant front and rear chambers, said casing having first duct-forming means extending rearwardly from the upper portion of the rear wall and communicating with said rear chamber, and second duct-forming means extending rearwardly from the upper portion of the rear wall and communicating with said front chamber, said first and second duct-forming means constituting a casing support extension being located in relatively remote, elevated relationship to the lower portion of said casing rear wall, there being an air inlet at the end of said first duct-forming means remote from the communication thereof with said rear chamber, there being an air outlet in the portion of said second duct-forming means remote from the communication thereof with said front chamber, and heat transfer means disposed within said front chamber and comprising a heat-impervious rounded corrugated sheet overlying the forwardly-presented surface of the divider panel and having evenly-spaced longitudinal, alternating half round countours, and on the face of said corrugated sheet a superimposed heat impervious fine mesh metal screen, and said front wall comprising a heat-pervious double-glazed pane with predetermined spacing between glazings, and wherein downwardly diverging baffles are disposed across the rear cool air chamber from back to front.

2. A solar heating device according to claim 1 wherein the double-glazed pane is sealed airtight on all sides.

3. A solar heating device according to claim 2 wherein the corrugated sheet is fastened to the divider panel, and, in turn, the fine mesh metal screen is fastened to the forwardly projecting half round contours of the corrugated sheet.

4. A solar heating device according to claim 3 wherein the metal screen is coated with a flat black paint.

5. A solar heating device according to claim 2 wherein the angle of inclination providing incidence to the sun is between about 5° and about 25°.

6. A solar heating device according to claim 5 wherein the angle of inclination providing incidence to the sun is between about 10° and about 17°.

7. A solar heating device according to claim 5 wherein the spacing between glazings in the front wall about ½ to about 1½ inches.

8. A solar heating device according to claim 5 wherein the inner and outer glazing of the front wall are polymeric sheeting.

9. A solar heating device according to claim 8 wherein the outer and inner glazings are fiber-reinforced polyester sheet material and polyvinylfluoride sheet material, respectively.

10. The solar heating device of claim 1 wherein the space between the inner glazing and the fine mesh screen is from about ¾ inch and about 1½ inches.

11. The solar heating device of claim 10 wherein mounted on the interior end of the first duct-forming means is a cool air intake means.

12. The solar heating device of claim 11 wherein affixed to the interior end of the second duct-forming means is a thermostat means for actuating and stopping the cool air intake means depending on the temperature of the air at the interior outlet of the second duct-forming means.

13. The solar heating device of claim 4 wherein the forwardly present corrugated sheet is coated with a flat black paint.

14. The solar heating device of of claim 1 wherein baffles are vertically disposed and in parallel and mounted against screening in the front hot air chamber.

* * * * *